United States Patent [19]

Campbell et al.

[11] 4,370,848
[45] Feb. 1, 1983

[54] BALING MACHINE WITH TAPERED BALE CHAMBER

[75] Inventors: Willis R. Campbell, Ephrata; John H. Freimuth, New Holland; Anthony F. Diederich, Jr., Terre Hill; Richard E. Jennings, New Holland, all of Pa.

[73] Assignee: Sperry Corporation, New Holland, Pa.

[21] Appl. No.: 305,063

[22] Filed: Sep. 24, 1981

[51] Int. Cl.³ .................................................. A01D 39/00
[52] U.S. Cl. ........................................... 56/341; 100/88
[58] Field of Search ...................... 56/341, 344; 100/88

[56] References Cited

U.S. PATENT DOCUMENTS 3,744,228  7/1973  Lundahl ............................. 56/344
3,901,007  8/1975  Blarshine et al. ................. 56/341

Primary Examiner—Jay N. Eskovitz
Attorney, Agent, or Firm—Darrell F. Marquette; Larry W. Miller; Frank A. Seemar

[57] ABSTRACT

In a roll baling machine, a portion of the bale chamber is tapered in width from top to bottom or from rear to front to facilitate bale ejection.

13 Claims, 6 Drawing Figures

BALING MACHINE WITH TAPERED BALE CHAMBER

BACKGROUND OF THE INVENTION

This invention relates generally to baling machines typically referred to as "round balers" which form cylindrical roll bales of crop material.

When a roll bale is formed in a conventional roll baling machine such as disclosed in U.S. Pat. No. 3,901,007, the end surfaces of the bale contact the sides of the base frame. In certain crops, the friction between the bale end surfaces and the sides of the base frame becomes so high that it is difficult to discharge a bale from the machine.

SUMMARY OF THE INVENTION

The present invention provides that in a roll baling machine having a bale chamber, at least a portion of the bale chamber is tapered in width from top to bottom or from rear to front to facilitate bale ejection.

In the preferred embodiment, the present invention provides a roll baling machine including a base frame, a rear frame pivotally connected to the base frame, a first portion of a bale chamber located in the base frame and tapered in width from its top to its bottom, and a second portion of the bale chamber located in the rear frame. The sides of the bale chamber first portion are spaced apart a slightly greater distance at the top than at the bottom thereof to provide the tapered shape.

DESCRIPTION OF THE PREFERRED EMBODIMENT

Figure 1:
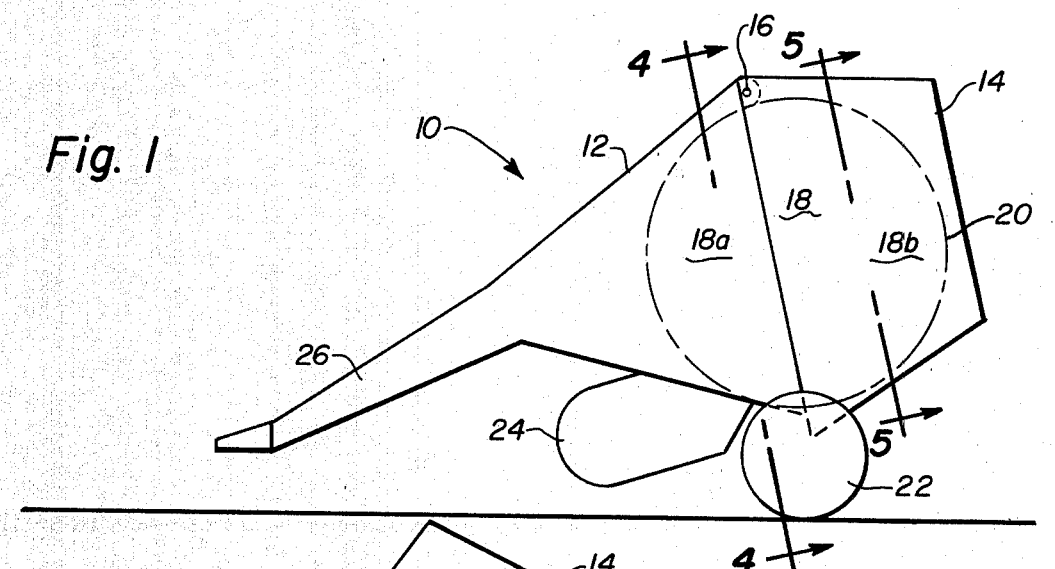
FIG. 1 is a side elevational view of a roll baling machine embodying the present invention taken when the machine is holding a bale.
Figure 3:
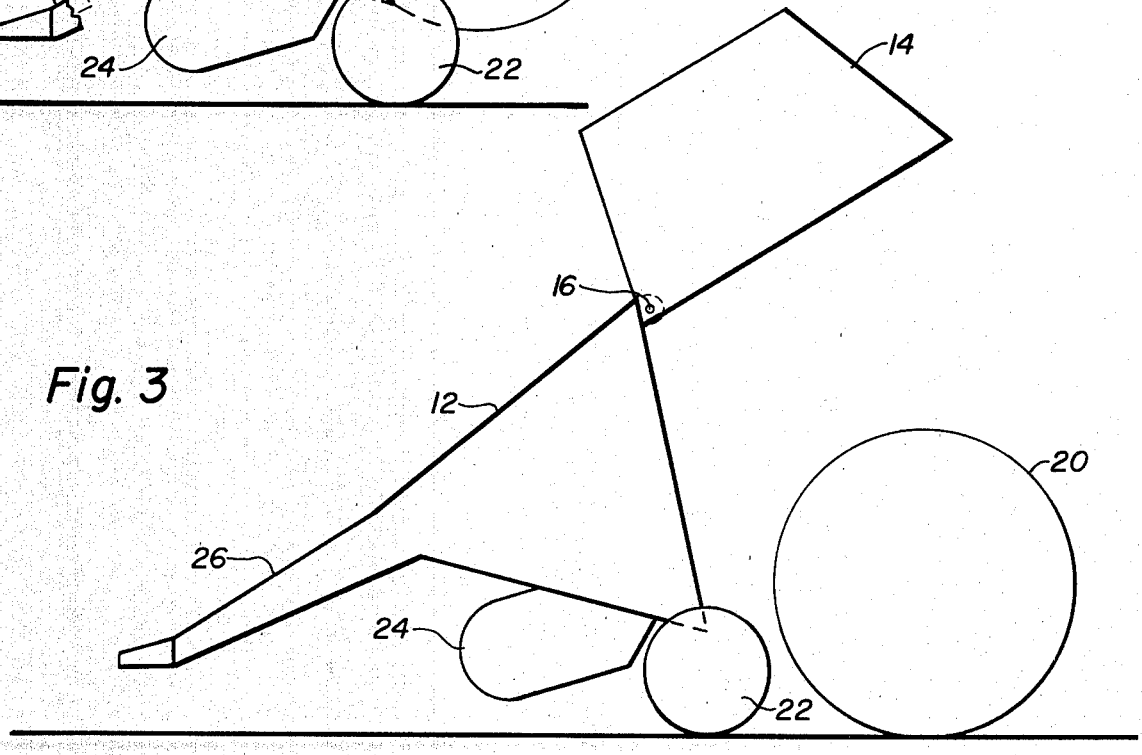
FIG. 3 is a side elevational view of the machine of FIG. 1 when the bale has been fully discharged from the machine.

Referring to FIG. 1, a roll baling machine 10 embodying the preferred embodiment of the present invention includes a base frame 12 and a rear frame 14 pivotally connected at 16 to the base frame 12. The rear frame 14 is movable from the lower position shown in FIG. 1 to the upper position shown in FIG. 3. The base frame 12 and the rear frame 14 together define a bale chamber 18 for holding a roll bale 20.

The machine 10 is supported by a pair of wheels 22 mounted on the base frame 12. A pickup mechanism 24 is attached to the base frame 12 for lifting windrowed crop material from the ground and delivering it into the bale chamber 18 where it is formed into roll bales by means such as the conventional upper and lower aprons disclosed in U.S. Pat. No. 3,901,007. A tongue 26 is provided on the base frame 12 for connection to a tractor so that the machine 10 may be pulled across a field.

Figure 4:
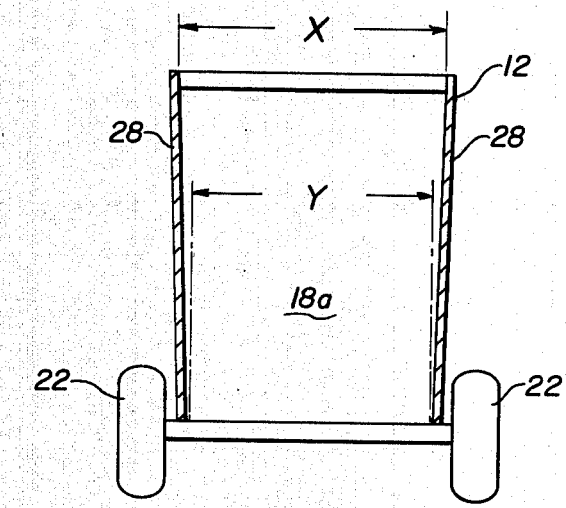
FIG. 4 is a view taken along the lines 4—4 of FIG. 1.

As seen in FIG. 4, the opposite sides 28 of the base frame 12 are spaced slightly further apart at the top than at the bottom. That is, the distance X between the opposite sides 28 at the top of the bale chamber 18 is preferably about one-half inch greater than the distance Y between the opposite sides 28 at the bottom of the bale chamber 18. Therefore, in the preferred embodiment, the portion 18a of the bale chamber 18 located in the base frame 12 is slightly tapered in width from its top to its bottom.

Alternatively, the bale chamber portion 18a could be tapered in width from its rear to its front. The opposite sides 28 of the base frame 12 would then be spaced slightly further apart at the rear than at the front.

Figure 5:
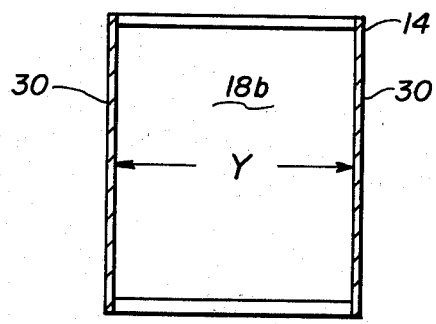
FIG. 5 is a view taken along the lines 5—5 of FIG. 1.

As seen in FIG. 5, the opposite sides 30 of the rear frame 14 are spaced apart the same distance, preferably distance Y, at the top and at the bottom. Thus, in the preferred embodiment, the portion 18b of the bale chamber 18 located in the rear frame 14 is the same width from its top to its bottom.

When a bale is formed in the bale chamber 18, the friction between the end surfaces of the bale and the opposite sides 28 of the base frame 12 is greater at the narrower part (i.e. the bottom in the preferred embodiment) of the bale chamber portion 18a than at the wider part (i.e. the top in the preferred embodiment) thereof. The friction gradually decreases from the narrower part toward the wider part of the bale chamber portion 18a. The decreased friction toward the wider part of the bale chamber portion 18a allows the bale to easily rotate out of the machine 10 when the rear frame 14 is raised to its upper position shown in FIG. 3.

Figure 2:
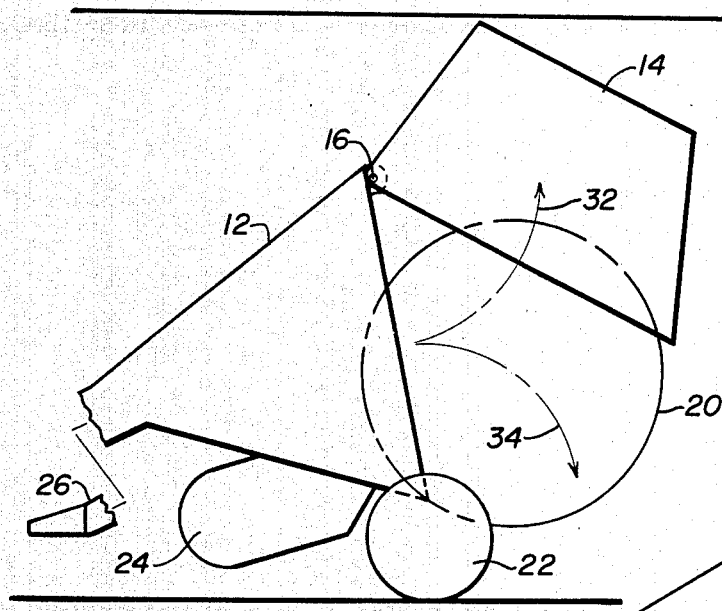
FIG. 2 is a side elevational view of the machine shown in FIG. 1 taken when the bale is being discharged from the machine.

Since the bale chamber portion 18b in the rear frame 14 has the narrower width Y, a narrower bale will be formed and the rear frame 14 will help to pull the bale out of the machine 10 when it is raised. As shown in FIG. 2, the rear frame 14 trys to pull the bale 20 in the direction of arrow 32 but the weight of the bale 20 causes it to drop in the direction of arrow 34.

Figure 6:
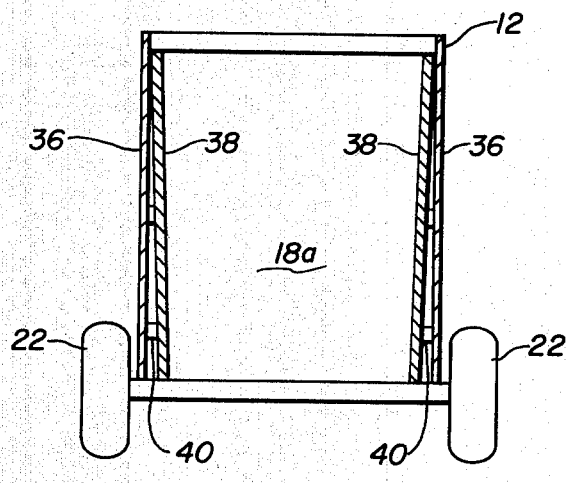
FIG. 6 is a view similar to FIG. 4 showing an alternative embodiment of the invention.

In the alternative embodiment shown in FIG. 6, the opposite sides 36 of the base frame 12 are substantially parallel and side sheets 38 are permanently or temporarily attached to the opposite sides 36 by conventional means such as brackets 40. The side sheets 38 are spaced slightly farther apart at the top than at the bottom. This provides the bale chamber portion 18a in the base frame 12 which is tapered in width from its top to its bottom.

Although the tapered portion of the bale chamber is located in the base frame 12 in the preferred embodiment, the present invention contemplates a modification where the tapered bale chamber portion would be located in the rear frame 14. The present invention also contemplates a modification where both the portion of the bale chamber located in the base frame 12 and the portion of the bale chamber located in the rear frame 14 would be tapered in width.

The following claims are intended to cover all modifications and variations of the preferred embodiments of the invention without departing from the spirit and scope of the invention.

Having thus described the invention, what is claimed is:

1. In a roll baling machine for forming cylindrical roll bales of crop material having a base frame and a bale chamber, wherein the improvement comprises at least a portion of said bale chamber being substantially tapered in width generally from its top to its bottom so that the friction between the end surfaces of a cylindrical roll bale and the sides of said bale chamber portion will be less generally toward the top of said bale chamber than toward the bottom thereof to facilitate discharge of a roll bale from the machine and whereby the weight of the roll bale aids in discharging it from the machine.

2. In the roll baling machine defined in claim 1, wherein said bale chamber portion is located in said base frame.

3. In the roll baling machine defined in claim 1, wherein the sides of the said bale chamber portion are spaced apart a first distance at the top and a second distance at the bottom, and said first distance is slightly greater than said second distance.

4. In a roll baling machine for forming cylindrical roll bales of crop material including a base frame, a rear frame pivotally connected to said base frame, and a bale chamber having a first portion located in said base frame and a second portion located in said rear frame, wherein the improvement comprises said first portion of said bale chamber being tapered in width generally from its top to its bottom so that the friction between the end surfaces of a cylindrical roll bale and the sides of said bale chamber first portion will be less generally at the wider part of said bale chamber first portion than at the narrower part thereof to facilitate discharge of a roll bale from the machine and whereby the weight of the roll bale aids in discharging it from the machine.

5. In the roll baling machine defined in claim 4, wherein the sides of said bale chamber first portion are spaced apart a first distance at the top and a second distance at the bottom and said first distance is slightly greater than said second distance.

6. In the roll baling machine defined in claim 5, wherein said second portion of said bale chamber is the same width from its top to its bottom, and the sides of said bale chamber second portion are spaced apart said second distance.

7. In the roll baling machine defined in claim 5, wherein said first distance is about one-half inch greater than said second distance.

8. In the roll baling machine defined in claim 4, wherein the top of said bale chamber first portion is wider than the bottom of said bale chamber first portion.

9. In the roll baling machine defined in claim 8, wherein said bale chamber second portion is the same width from its top to its bottom, and the top of said bale chamber first portion is wider than said bale chamber second portion.

10. In a roll baling machine for forming cylindrical roll bales of crop material including a base frame, a rear frame pivotally connected to said base frame, the improvement comprising said base frame and said rear frame defining a bale chamber, and at least a portion of said bale chamber being tapered in width generally from its top to its bottom so that the friction between the end surfaces of a cylindrical roll bale and the sides of said bale chamber portion will be less generally at the wider part of said bale chamber portion than at the narrower part thereof to facilitate discharge of a roll bale from the machine and whereby the weight of the roll bale aids in discharging it from the machine.

11. In a roll baling machine for forming cylindrical roll bales of crop material having a bale chamber, the improvement comprising at least a portion of said bale chamber being substantially tapered in width generally from its top to its bottom so that the friction between the end surfaces of a cylindrical roll bale and the sides of said bale chamber portion will decrease generally from the bottom of said bale chamber portion toward the top thereof to facilitate discharge of a roll bale from the machine and whereby the weight of the roll bale aids in discharging it from the machine.

12. In a roll baling machine for forming cylindrical roll bales of crop material having a base frame and a bale chamber, wherein the improvement comprises at least a portion of said bale chamber being substantially tapered in width generally from its rear to its front so that the friction between the end surfaces of a cylindrical roll bale and the sides of said bale chamber portion will be less generally at the rear of said bale chamber portion than at the front thereof to facilitate discharge of a roll bale from the machine and whereby the weight of the roll bale aids in discharging it from the machine.

13. In a roll baling machine for forming cylindrical roll bales of crop material having a bale chamber, the improvement comprising at least a portion of said bale chamber being substantially tapered in width generally from its rear to its front so that the friction between the end surfaces of a cylindrical roll bale and the sides of said bale chamber will decrease generally from the front of said bale chamber portion toward the rear thereof to facilitate discharge of a roll bale from the machine and whereby the weight of the roll bale aids in discharging it from the machine.

* * * * *